US012548703B2

(12) United States Patent
Mrad

(10) Patent No.: US 12,548,703 B2
(45) Date of Patent: Feb. 10, 2026

(54) INDUCTOR MODULE WITH IMPROVED THERMAL PERFORMANCES

(71) Applicant: Schaffner EMV AG, Luterbach (CH)

(72) Inventor: Roberto Mrad, Zuchwil (CH)

(73) Assignee: Schaffner EMV AG, Luterbach (CH)

( * ) Notice: Subject to any disclaimer, the term of this patent is extended or adjusted under 35 U.S.C. 154(b) by 911 days.

(21) Appl. No.: 17/670,329

(22) Filed: Feb. 11, 2022

(65) Prior Publication Data

US 2022/0270805 A1 Aug. 25, 2022

(30) Foreign Application Priority Data

Feb. 22, 2021 (CH) .................................... 00180/21

(51) Int. Cl.

| | |
|---|---|
| ***H01F 27/28*** | (2006.01) |
| ***B60L 53/302*** | (2019.01) |
| ***H01F 27/02*** | (2006.01) |
| ***H01F 27/08*** | (2006.01) |
| ***H01F 41/00*** | (2006.01) |
| ***H01F 41/04*** | (2006.01) |
| ***H02M 1/42*** | (2007.01) |

(52) U.S. Cl.

CPC ............ *H01F 27/08* (2013.01); *B60L 53/302* (2019.02); *H01F 27/025* (2013.01); *H01F 27/28* (2013.01); *H01F 41/005* (2013.01); *H01F 41/04* (2013.01); *H02M 1/4225* (2013.01)

(58) Field of Classification Search

CPC ........ H01F 27/08; H01F 27/025; H01F 27/28; H01F 41/005; H01F 41/04; H01F 27/02; H01F 27/022; H01F 27/04; H01F 27/2895; H01F 27/22; B60L 53/302; H02M 1/4225

USPC ................................................ 336/61, 55–60

See application file for complete search history.

(56) References Cited

U.S. PATENT DOCUMENTS

| | | | | |
|---|---|---|---|---|
| 3,979,549 A * | 9/1976 | Wilkinson | ............. | H01B 17/26 428/420 |
| 6,081,180 A * | 6/2000 | Fernandez | ............ | H01F 17/062 336/229 |
| 6,392,519 B1 * | 5/2002 | Ronning | ............... | H01F 27/025 336/61 |
| 2013/0265129 A1 * | 10/2013 | Ansari | .................... | H01F 27/22 336/61 |

(Continued)

FOREIGN PATENT DOCUMENTS

| | | |
|---|---|---|
| EP | 2874162 A1 | 5/2015 |
| JP | 2007227661 A | 9/2007 |

(Continued)

OTHER PUBLICATIONS

English Translation of Office Action issued in Chinese Patent Application No. 2022101573433, mailed on Apr. 30, 2025, 11 pages.

*Primary Examiner* — Shawki S Ismail
*Assistant Examiner* — Kazi S Hossain
(74) *Attorney, Agent, or Firm* — BLANK ROME LLP

(57) ABSTRACT

An inductor module comprising one or several wound inductors in a metallic housing, held in place by potting compound, wherein a surface of the metallic housing is a mechanical and thermal interface to a heat sink, and the distance between the coils and the inner side of the surface is predetermined by a suitable insulating space of potting compound. The invention may be used as PFC inductor in an on-board vehicle charger, among other uses.

12 Claims, 3 Drawing Sheets

(56) References Cited

U.S. PATENT DOCUMENTS

| | | | | |
|---|---|---|---|---|
| 2015/0213938 | A1* | 7/2015 | Sakaguchi | H01F 27/28 206/408 |
| 2017/0154723 | A1* | 6/2017 | Miki | H01F 27/02 |
| 2020/0143971 | A1* | 5/2020 | Sheehan | H01F 27/29 |
| 2020/0234868 | A1 | 7/2020 | Grieger et al. | |
| 2021/0035725 | A1 | 2/2021 | Ying et al. | |
| 2021/0118609 | A1* | 4/2021 | Schneggenburger | H01F 41/127 |

FOREIGN PATENT DOCUMENTS

| | | | |
|---|---|---|---|
| JP | 2010/114359 | A | 5/2010 |
| JP | 2011113995 | A | 6/2011 |
| JP | 2013131567 | A | 7/2013 |
| WO | WO-2018/193098 | A1 | 10/2018 |

* cited by examiner

Fig. 8a
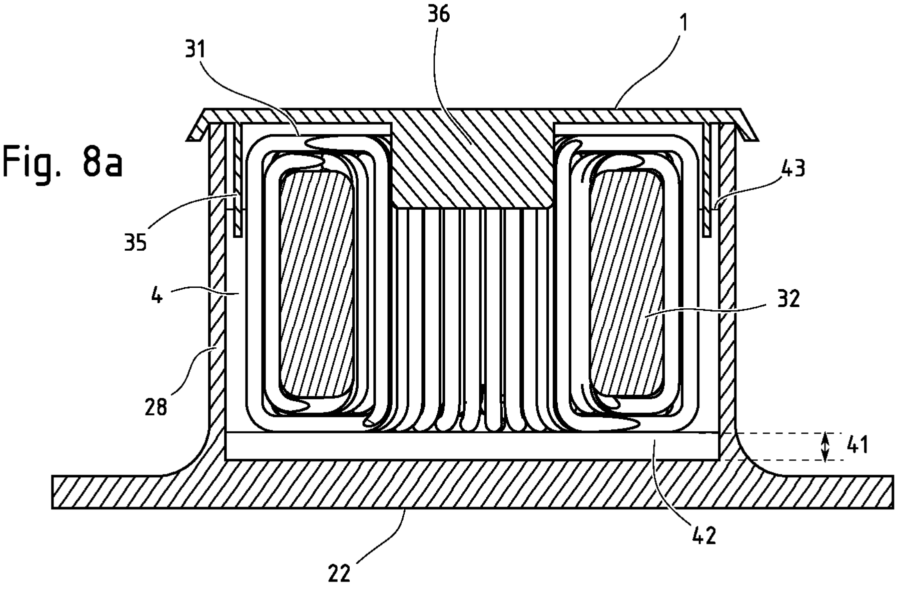
Fig. 8b
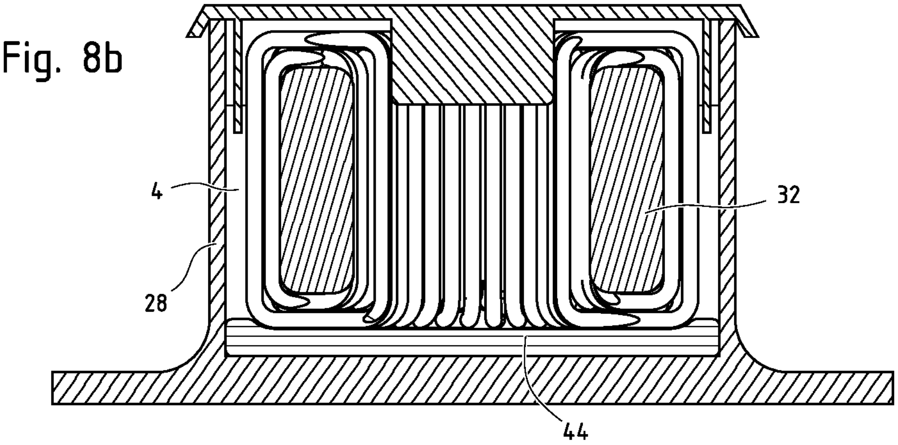
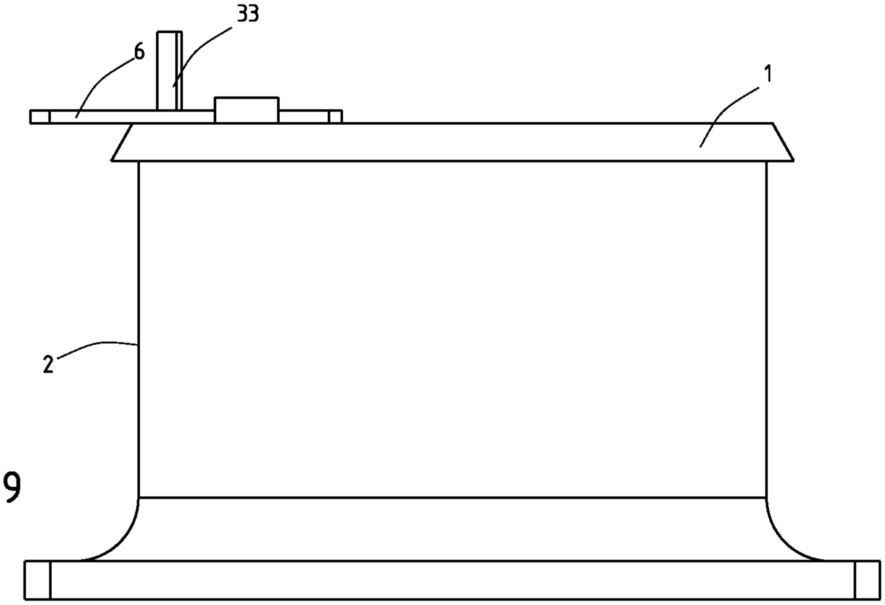
Fig. 9

INDUCTOR MODULE WITH IMPROVED THERMAL PERFORMANCES

REFERENCE DATA

The present application claims priority of Swiss patent application CH 00180/21 of Feb. 22, 2021, the content whereof is entirely incorporated.

TECHNICAL DOMAIN

The present invention concerns an inductor module and a manufacturing method thereof.

RELATED ART

Inductors are key elements of power electronics and are found in a wide range of applications in all industrial sectors. Inductors are used, among others, in filter, voltage converters, and in power factor compensation.

Besides their electrical characteristics, inductors and inductor modules must also fulfil specifications for dimensions, heat dissipation, heat resistance, immunity to vibrations, and many other parameters. In automotive applications, where electrical components are more and more common, these specifications are especially stringent. As a result, despite the apparent simplicity of the underlying electric circuit, inductors are complex products that are difficult to design and customize to all the possible applications.

A state-of the art inductor is the result of a trade-off between the desired nominal inductance value, the size, weight, and footprint dictated by the desired application, the choice of material, layout, and cooling.

It is known to use power inductors in power-factor compensation in monophase and polyphase systems. In a three-phase system, a Power Phase Correction inductor, also known under PFC inductor or PFC choke may include three independent inductors, each comprising a winding on a magnetic core providing of suitable permeability. Magnetic cores may be toroidal or take different forms. It is also known to encapsulate the inductors into a solid potting compound to improve heat transmission, exclude gaseous discharges, protect them from water, moisture, or corrosion, and improve their resistance to shock and vibration.

All inductor module exhibit energy losses, among others due to the winding's resistance, to hysteresis in the core, or to eddy currents. In high-power applications, loss-generated heat must be evacuated from the magnetic assembly lest it impairs the performances of the inductor. The lower the thermal resistance between the inductor and the available heat sinks, the higher will be power rating and power density.

Some specially demanding applications, for example those in the automotive sector, require superior manufacturability, reliability, resistance to mechanical shocks and vibrations in an extended temperature range, together with a precise control of the tolerances and low thermal drifts.

SHORT DISCLOSURE OF THE INVENTION

An aim of the present invention is the provision of an inductor module that Guarantees the thermal stability and improves the thermal performances at steady state of known inductors and presents a superior manufacturability.

A second aim of the present invention is to provide a manufacturing method of such an inductor module.

According to the invention, these aims are attained by the object of the attached claims, and especially by an inductor module comprising: at least one coiled inductor comprising a winding on a magnetic core, a housing enclosing said inductor in a cavity and arranged to have at least one thermal exchange surface fixed on a cooled plate, at least one input terminal and one output terminal for connecting said at least one inductor to an external electrical network, and the cavity is filled with a potting compound, creating a thermal link between the inductor and the housing so that said at least one inductor is at least partially surrounded by said potting compound, wherein the inductor module further comprising a lid over the housing, the lid having a lower face with protrusions that reach downwards into the cavity and are bonded to the potting compound.

Dependent claims deal with features of the invention that, while important or advantageous, are not essential, for example: a lid atop the housing for sealing the cavity or cavities; the cavities of the housing configured to hold the potting compound in a fluid state during the assembly, the thermal exchange face is at the lowermost part of the housing, opposed to an aperture of the housing closed by the lid, so as the lid is arranged for closing the aperture or apertures of the housing; electric contact plates on a face of the housing; a thickness of potting compound between the inductor and the thermal exchange face is less than 5 mm, preferably less than 2 mm, more preferably less than 1 mm but more than zero; protrusion on the lower face of the lid that reach downwards and are bonded to the curing compound; pouring holes on the lid for pouring said potting compound in a fluid state during the assembly; The nature of the potting that may be an epoxy, polyurethane, silicone, or any other synthetic curable resin; an aluminium die-cast housing; toroidal inductors.

Another object of the invention is achieved by a manufacturing method including: providing a housing with one or several receptacles open towards an upper side of the housing and having a closed bottom adjacent to a thermal exchange face at a lower side of the housing, placement of an insulator on the bottom of the one or several receptacles, filling partially the receptacles with a predetermined amount of liquid potting compound, inserting a coiled inductor into each of the one or several receptacles such that it is at least partially immerged in the potting compound and rests on the insulating layer, allowing the potting compound to cure. The insulator may be a layer of potting compound poured in a predetermined volume and allowed to cure before the insertion of the inductors, or an insulating spacer.

The method of the invention may include also a lid placed on the housing before the curing of the potting compound, the lid having protrusion that reach downwards and dip into the liquid potting compound, whereby it is bonded to the potting compound after curing.

The inductor of the invention lends itself to many uses but, thanks to its compacity and ruggedness, is particularly suited for automotive applications. A notable use of the invention is a power-factor correction unit of a battery charger in a hybrid or electric vehicle.

With respect to what is known in the art, the invention provides the advantage that the free surface of potting compound resulting from the partial filling of the housing allows a contraction/dilation of the potting compound during curing and/or thermal cycles, without causing a detachment of the potting from the inner faces of the housing. Moreover, this solution reduces the quantity of potting compound, which leads to reduced manufacturing costs.

Another advantage lies in the minimized distance between the lowermost part of the inductors and the thermal exchange face. This configuration guarantees a low thermal resistance, facilitating therefore the cooling of the inductor module.

The present disclosure and claims use the words "upper" "lower" "top" "bottom" to refer to various parts of the inductive module. It shall be understood that these terms do not limit the invention. Indeed, the inventive inductor will function and may be used regardless its orientation in space. These expressions shall be construed in relation to the vertical direction at the manufacturing of the module, or else to the conventional orientation in which the mechanical and thermal interface is below, and the cover is above.

SHORT DESCRIPTION OF THE DRAWINGS

Exemplar embodiments of the invention are disclosed in the description and illustrated by the drawings in which.

Figure 6:
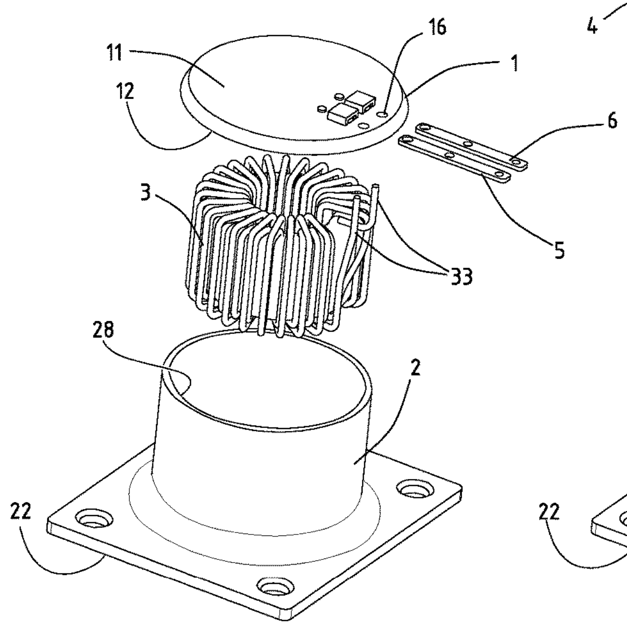
FIG. 6 shows an exploded view of a monophase inductor module.

FIGS. 8*a* and 8*b* shows monophase inductor module of FIG. 6 in sectional view and in two variants. The section surfaces of the potting compound have not been hatched to avoid cluttering the drawing.

FIG. 9 shows a profile view of the monophase inductor module of FIG. 6.

EXAMPLES OF EMBODIMENTS OF THE PRESENT INVENTION

Figure 1:
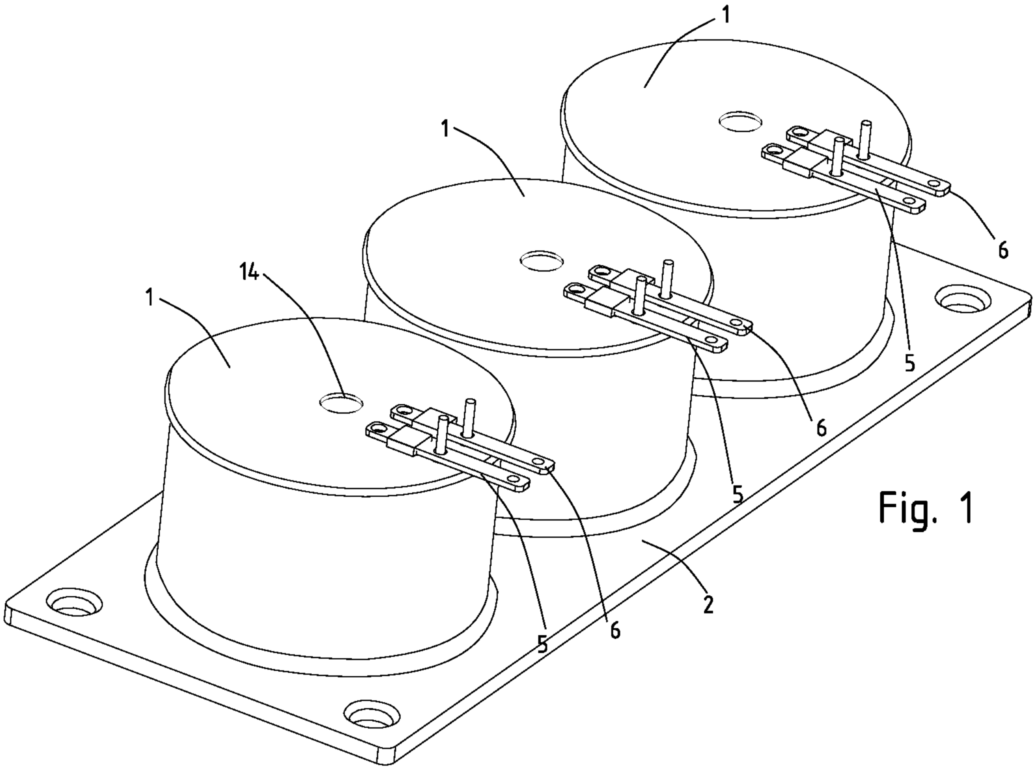
FIG. 1 shows a tri-phase induction module according to an aspect of the invention.
Figure 2:
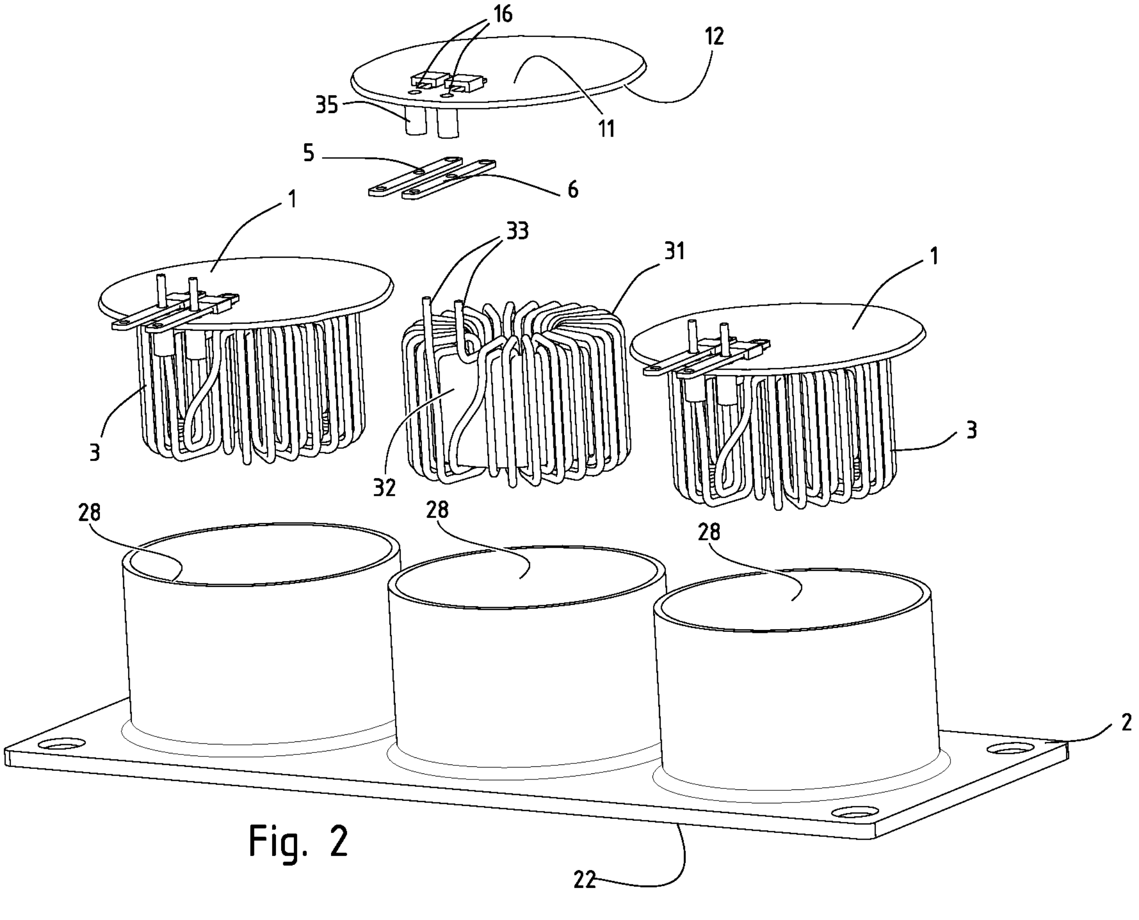
FIG. 2 illustrates an exploded view of the tri-phase inductor module of FIG. 1.

FIGS. 1 and 2 shows a triphasic inductive module according to the invention, in a housing 2. The housing 2 comprises three receptacles 28 that enclose each an inductor 3 and are covered by a lid 1. The example shown has three independent lids 1, each covering a receptacle 28, but this is not an essential feature: the invention admits variants with a single lid covering all the receptacles.

Lids 1 carry on their upper side the electric terminals 5, 6 of the inductors while the inductors themselves are in the receptacles 28. These are configured to enclose the inductors in a plurality of cavities that will be filled with a potting compound. In the illustrated example, the cavities are cylindrical, this being the shape of the coils, and independent from each other. This configuration minimizes the volume of potting for coils of this shape but is not the only one possible.

The inductors 3 and/or the cavities 28 may have a different shape, and the cavities may be communicating without leaving the scope of the invention. The housing 2 and the lids or lid 1 are assembled to form the inductive module. The housing 2 has an interface surface 22—here the bottom one—that servers for affixing the module in the intended location and for heat transfer. In many applications the inductive module will be fastened with the interface surface pressed against a heat sink, or a cooled corresponding surface. The interface surface 22 may be flat to maximize the contact area, but other configurations are possible.

The applications in which the inductive module of FIG. 1 are several. An important one is a PFC inductor module for on-board battery charger in an electric or hybrid vehicle, thanks the compactness and power density of the inventive device.

The number of inductors is not essential either, and may be one, two, three, or as many as the application require. Similarly, the invention is not limited to the case of a solid housing and one or more lids, is not necessarily made of two parts, but may be realised in one piece filling the functions of housing and lid, or any other arbitrary number of parts.

As FIG. 1 shows, each inductor 3 comprised in the module has two contact plates 5 and 6 on the outer face 11 of the corresponding lid. Other configurations are possible, however. The number of windings and terminals of each magnetic device is not limited. The lids 1 have, in the example shown in FIG. 1, holes 14 for filling the housing 2 with the liquid potting compound.

Since the top lids 1 carry the electric terminal 5, 6 used to insert the inductors in the target circuit, it may advantageously be made from an insulating material, for example a suitable technical polymer. The housing 2 serves as thermal and mechanical interface and is preferably metallic, for example a die-cast aluminium part.

FIG. 2 shows three toroidal coils 3 are mounted against the inner face 12 of a corresponding lid, so that the symmetry axis of each coil 3 is perpendicular to the inner face. Each coil comprises a soft magnetic core 32 of a high-permittivity and low-loss material, such as powdered iron, laminated magnetic steel, or ferrite, around which a copper wire 31 is wound up. The terminals of the windings are formed into straight leads 33 that pass through the leads holes 16 of the lid, to be connected (by welding, soldering, crimping, . . . ) to the tabs 5, 6.

The cavities 28 are configured to be filled with a potting compound to improve the thermal stability of the inductor. The liquid potting compound is poured into housing through the pouring holes 14 if present, or before the lid is placed, and is then hardened by curing, forming a thermal link between the inner face the cavities 28 and the coils 3. The quantity or level of the poured potting compound can be adapted to optimize the thermal stability. In the present embodiment, thermal stability means that the inductor should be able to operate at steady state with temperatures, for example up to 125° C., 135° C. or 150° C. according to the specifications and the properties of the magnetic material.

Preferably, the lid 1 has protrusions 35 that extend downwards and dip into the potting compound. The protrusions 35 in this example are configured to create an insulated bushing around the leads 33. Other possible configurations, that can replace the lid 1 as illustrated in FIG. 2, will be disclosed in further embodiments (see FIG. 8). These protrusions increase the creepage distance and the device's voltage rating, avoiding electric discharges. The free level of the potting compound shall preferably be some millimetres higher than the lowermost point of the protrusions 35.

Figure 3:
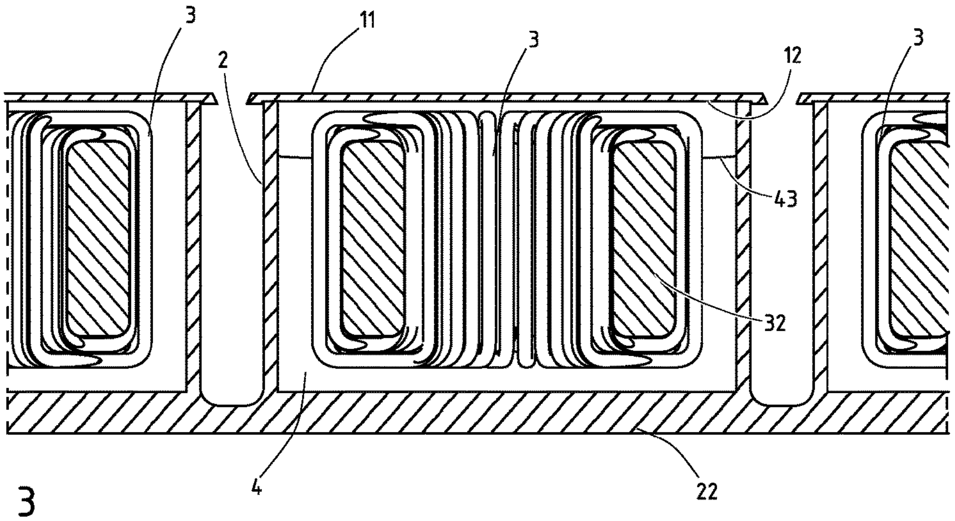
FIG. 3 illustrates cross longitudinal view of the tri-phase inductor of FIG. 1.

As shown in FIG. 3, the quantity of potting compound 4 is adjusted to a predesigned level 43, that is chosen according to the desired thermal performance and lifetime of the part. The potting material is chosen to provide the needed thermal conductivity and withstand the required number of thermal cycles of expansion and contraction. It is not needed that the coils be fully immersed in the potting, in general, but this could be contemplated in the invention.

Figure 5:
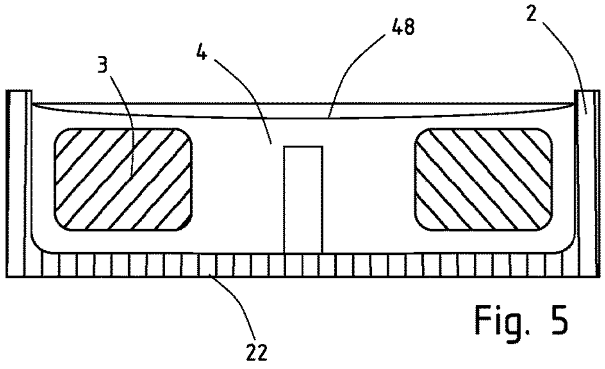
FIG. 5 shows a schematic transversal cross view of an induction module.

The presence of a free surface 43 of potting below the inner face 12 of the top part provides a certain freedom degree for volume changes during the curing of the potting. This free surface prevents a lifting of the potting from the thermal exchange surface 22 due to a contraction during the curing or the cooling of the potting compound 4. FIG. 5 shows an embodiment of the present invention with a free surface of potting compound 4 with two inductors 3. The meniscus visible on the surface 48 is due to the shrinkage of the potting when curing. An advantage of the invention is that the shrinkage happens at the top side only. The lower side remains flat and adheres perfectly to the bottom of the housing 2, thus providing an optimal thermal interface.

The potting compound may be any type of adapted curable resin such as epoxy resin, polyurethane resin, or silicone resin.

Figure 4:
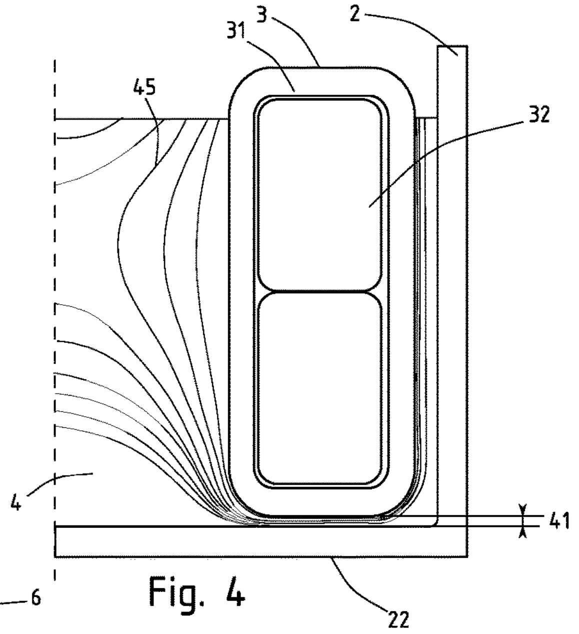
FIG. 4 shows an idealized cross view of the tri-phase inductor of FIG. 1 with isothermal lines resulting from a numerical simulation of the inductor at full steady power.

FIG. 4 is a simplified representation of an inductor according to the invention in a housing 2, partially immersed in potting compound 4. The figure shows the steady state isothermal lines in the device, obtained by a numeric simulation, from the copper and iron losses. The temperatures range from 130° C. in the centre of the cores to 65° C. at the bottom face 22, which is thermally connected to a suitable heat sink. The isothermal lines show that most of the heat is transmitted to the lower face through the gap 41 between the lowermost point of each inductor 3 and the thermal exchange face 22.

Since most of the heat will be exchanged through the bottom surface 22, the gap 41 is kept short and its size is carefully controlled to minimize the thermal resistance. Typically, the thickness of this bottom potting layer is smaller than 5 mm, preferably less than 2 mm and even more preferably less than 1 mm. In a typical automotive application at 450 V nominal voltage, commercially available potting compounds allow a distance 41 of 0.5 millimetres approximately. For higher voltages, the gap will be as small as the maximum voltage rating allows.

The invention is not limited to a specific use case and may find use in several applications with different values of voltage, current, power, and impedance. An important embodiment of the invention is that of a three-phase PCF inductor for a charger for an electric vehicle. In which case the voltage may be of 450 V, 800V, or above, for a charging power of several kW and inductances of hundreds of μH.

FIG. 6 shows an exploded view of an inductor module comprising a housing 2 covered by a lid 1, enclosing one inductor 3.

Ai in the triphasic embodiment, two contact plates 5 and 6 are disposed on the outer face 11 of the top part 1 for connecting the inductor to an external electrical network. The bottom housing comprises a metallic cylinder that encloses laterally the inductor and a thermal exchange face 22 which is opposed to an aperture of the housing closed by the lid. The thermal exchange face is configured to be fixed on a cooled plate.

In this embodiment, the inductor is also a toroidal magnetic core 32 around which a copper wire 31 is wound up, as it is illustrated in FIGS. 8 and 9.

As for the three-phase embodiment, the thickness of potting compound 41 between the lowermost point of the inductor 3 and the thermal exchange face 22 is made significantly small to minimize the thermal resistance. Typically, this distance is smaller than 5 mm, preferably less than 2 mm and even more preferably less than 1 mm.

Figure 7:
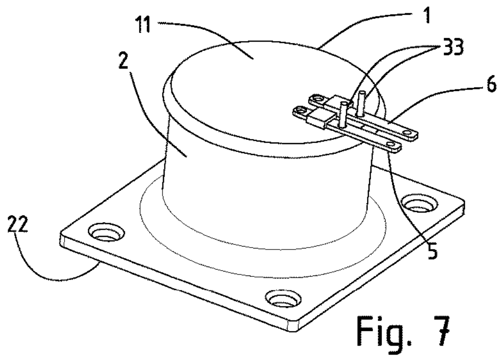
FIG. 7 shows a perspective view of the monophase inductor module of FIG. 6.

In the embodiment represented in FIG. 7, there are no pouring holes nor screwing holes. These are not in fact necessary or essential, although they may be convenient in some cases. A method of fabrication of the inventive device will now be described with reference to FIGS. 8*a* and 9.

Initially, an insulator 42 is provided at the bottom of the housing. The insulator 42 will determine the distance 41 between the coil 3 and the bottom surface that, as disclosed above, is an important parameter determining the thermal performances of the magnetic device. In a possible manufacturing method, this insulator 42 is obtained through a two-step curing process: a predetermined amount of curing compound is poured the receptacles or in the receptacles of the housing to form a layer having a thickness equal to the desired distance between the coil and the bottom and allowed to solidify. This first curing can be accelerated, for example by heat, if desired.

Once the layer 42 on the bottom is sufficiently cured, more potting compound is poured in the cavities and the coils 3 are inserted therein together with the lid 1. The potting compound may be added after the positioning of the coils in the cavities if the lid 1 has apertures to this purpose. Otherwise, the potting compound shall be added before the lid 1. After a second curing, the potting compound will form a continuous mass up to a predetermined level 43 in the housing, without separation to the bottom insulating layer 42. The separation line between the insulator 42 and the potting above in FIG. 8*a* is virtual and has the sole purpose of illustrating the process.

Advantageously, the lid 1 has protrusions 35 that reach downwards and dip into the potting compound 4 and become bonded with it once the potting compound is cured. This brings several advantages. On one hand, the protrusions 35 are shaped to surround the coil 3 and the leads 33 to provide an insulating barrier, increasing the length of the creeping path between the coil 3 and the leads 33—which can be considered equipotential—and the metallic housing 2 at ground. Moreover, after the curing phase the lid will be bonded to the potting mass 4 and held in position without the need for screws or fasteners. Additionally, the protrusion 35 may be configured to centre the coil 3 in the receptacle 28 and ensure that it is always separate from its sides. In this method, the coil 3 is never rigidly held in position and can move freely, within the limits dictated by the bottom insulator 42 and the centring structures 35, 36, until it is englobed in the solidified compound 4. As in the former embodiment, the terminals of the coils are inserted through suitable apertures of the lid 1 and welded or soldered to the connection tabs 5, 6 by any suitable means, for example by laser soldering.

The centring of the coil 3 may be obtained also by other means, of which the axial protrusion 36 is an example among many.

In a possible alternative, as shown in FIG. 8*b*, the insulator may be a separate piece, for example a thermally conductive, electrically insulating spacer 44 that is positioned on the bottom of the receptacles before the insertion of the coils. This solution may be faster to manufacture since it avoids the preliminary curing stage. The spacer 44 may be fabricated by moulding a polymer material that has a low thermal impedance, of a composite comprising a thermally-conductive filler in an elastomer or thermoplastic polymer, or of any other suitable thermal interface material.

This filling mode can also be applied to the three-phase inductor module described above or to any inductor module with an arbitrary number of inductors.

In possible variants, the coil or coils may be fixed to the underside of the lid by adhesive before the insertion and/or the lid may be screwed on the enclosure 2.

REFERENCE NUMBERS

1 lid
2 housing or enclosure
3 coil or inductor
4 potting compound
5 contact plate, input terminal
6 contact plate, output terminal
11 top face
12 inner face
14 pouring holes, hole
16 leads holes
22 bottom face
28 receptacle, cavity
31 wire or winding
32 core
33 leads
35 protrusions
36 centring fixture
41 insulation distance
42 insulator
43 potting level
44 spacer
45 isothermal lines
48 meniscus

The invention claimed is:

1. An inductor module comprising:

at least one inductor comprising a winding on a magnetic core, a housing enclosing said inductor in a cavity and having at least one thermal exchange surface fixable on a cooled plate, at least one electric terminal for connecting said inductor to an external electrical network, wherein, the cavity is partially filled with a potting compound, creating a thermal link between the inductor and the housing so that said inductor is at least partially surrounded by said potting compound, wherein the inductor module further comprising a lid of an insulating material over the housing, the lid having, above a free surface of the potting compound, a lower face with protrusions that reach downwards into the cavity below the free surface and are bonded to the potting compound holding the lid in position, wherein the winding has terminals that pass through holes traversing the lid and the protrusions, such that the protrusion create an insulated bushing around the terminals configured to increase a creepage distance between the inductor and the housing.

2. The inductor module of claim 1, wherein each cavity of the housing is configured to hold the potting compound in a fluid state during the assembly.

3. The inductor module of claim 1, wherein the thermal exchange face is the lowermost part of the housing.

4. The inductor module of claim 1, comprising two electric terminals configured as input terminal and output terminal, each consist of a contact plate on a top face of the lid.

5. The inductor module of claim 1 wherein a thickness of potting compound between the inductor and the thermal exchange face is less than 5 mm, preferably less than 2 mm, more preferably less than 1 mm, but more than zero.

6. The inductor module of claim 1, wherein the thermal exchange face is opposed to an aperture of the housing closed by the lid.

7. The inductor module of claim 1, wherein the lid comprises at least one hole for pouring said potting compound in a fluid state during the assembly.

8. The inductor module of claim 2, wherein said potting compound is a synthetic curable resin.

9. The inductor module of claim 1, wherein the housing includes an aluminium die-cast part.

10. The inductor module of claim 4, wherein the plates are disposed on a top face of the lid opposed to the thermal exchange surface.

11. The inductor module of claim 1, wherein said at least one inductor is toroidal.

12. A use of the inductor module of claim 1 in an electric or hybrid vehicle, for example in a power-factor correction unit of a battery charger.

* * * * *